US011356826B2

(12) United States Patent
Hall et al.

(10) Patent No.: US 11,356,826 B2
(45) Date of Patent: Jun. 7, 2022

(54) MEDICAL INTERNET OF THINGS DEVICE DISCOVERY

(71) Applicant: Medic, Inc., Provo, UT (US)

(72) Inventors: David R. Hall, Provo, UT (US); Monte Johnson, Provo, UT (US); K. Jeffrey Campbell, Spanish Fork, UT (US); David Crismon, Herriman, UT (US); Joshua Dutton, Provo, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/904,411

(22) Filed: Jun. 17, 2020

(65) Prior Publication Data

US 2020/0396578 A1 Dec. 17, 2020

Related U.S. Application Data

(60) Provisional application No. 62/888,780, filed on Aug. 19, 2019, provisional application No. 62/862,663, filed on Jun. 17, 2019, provisional application No. 62/862,670, filed on Jun. 17, 2019.

(51) Int. Cl.
| H04W 8/00 | (2009.01) |
| H04L 9/08 | (2006.01) |
| H04W 12/40 | (2021.01) |
| H04W 12/0431 | (2021.01) |
| H04W 4/70 | (2018.01) |
| H04W 76/11 | (2018.01) |
| H04L 67/12 | (2022.01) |
| G16Y 10/60 | (2020.01) |

(52) U.S. Cl.
CPC .............. H04W 4/70 (2018.02); G16Y 10/60 (2020.01); H04L 9/0841 (2013.01); H04L 67/12 (2013.01); H04W 8/005 (2013.01); H04W 12/0431 (2021.01); H04W 12/40 (2021.01); H04W 76/11 (2018.02); H04L 2209/80 (2013.01)

(58) Field of Classification Search
CPC ... H04W 74/002; H04W 84/12; H04W 48/16; H04W 76/15; H04L 65/605; H04L 65/608; H04L 67/18; H04L 27/00
See application file for complete search history.

(56) References Cited

U.S. PATENT DOCUMENTS

2020/0092923 A1* 3/2020 Abraham .............. H04W 76/28
2020/0336520 A1* 10/2020 Redding ............... H04L 1/0006
2021/0152808 A1* 5/2021 He ......................... H04N 21/84

* cited by examiner

Primary Examiner — Iqbal Zaidi

(57) ABSTRACT

Devices and methods for internet of things (IOT) discovery/auto discovery are described. A discovery packet is received from a device. The discovery packet includes a first stream identifier and a request to establish a second stream. A stream acceptance packet is sent to the device. The stream acceptance packet includes the first stream identifier and an input for generating a second stream identifier. A first association is added to the registration based on the request to establish the second stream. The first association is between the second stream identifier and a determined destination. A first data packet is received from the device, where the first data packet includes/utilizes the second stream identifier. The first data packet is sent to the destination based on the first association in the registration.

20 Claims, 9 Drawing Sheets

MEDICAL INTERNET OF THINGS DEVICE DISCOVERY

CROSS-REFERENCE TO RELATED APPLICATIONS

This application claims the benefit of U.S. Provisional Application No. 62/862,670, filed Jun. 17, 2019, U.S. Provisional Application No. 62/862,663, filed Jun. 17, 2019, and U.S. Provisional Application No. 62/888,780, filed Aug. 19, 2019, each of which is incorporated by reference herein in its entirety.

TECHNICAL FIELD

This application is related to auto discovery of Internet of Things (IoT) devices as well as the auto discovery and establishment of data streaming for IoT devices.

BACKGROUND

IoT devices are designed to either not connect directly to the Internet or to only connect to a manufacturer's servers and infrastructure. In either case, IoT are generally not automatically discoverable. Instead, IoT devices typically need to individually provisioned and managed. Furthermore, despite the quantity of sensors and data that is gathered by those sensors, there is not an option for streaming data from sensors to a unified dashboard. It is desired to be able to address these challenges and improve the way IoT devices are managed and handle data.

SUMMARY

In a first aspect, the disclosure describes a method for internet of things (IOT) discovery. The method includes receiving a discovery packet from a device, wherein the discovery packet comprises a first stream identifier and a request to establish a second stream, identifying a registration associated with the device based on the first stream identifier, determining a destination for the second stream based on the request to establish the second stream, sending a stream acceptance packet to the device, wherein the stream acceptance packet comprises the first stream identifier and an input for generating a second stream identifier, adding a first association to the registration based on the request to establish the second stream, wherein the first association is between the second stream identifier and the destination, receiving a first data packet from the device, wherein the first data packet comprises the second stream identifier, and sending the first data packet to the destination based on the first association in the registration.

In a second aspect, the disclosure provides that the method further includes determining whether the first stream identifier exists in the registration.

In a third aspect, the disclosure provides that the method further includes disregarding the discovery packet when the first stream identifier does not exist in the registration.

In a fourth aspect, the disclosure provides that the method further includes processing the discovery request when the first stream identifier exists in the registration, and accepting the request to establish the second stream when the first stream identifier exists in the registration.

In a fifth aspect, the disclosure provides that the input initiates a key establishment procedure with the device.

In a sixth aspect, the disclosure provides that the key establishment procedure is a Diffie-Hellman key exchange.

In a seventh aspect, the disclosure provides that at least a portion of the second stream identifier is a secure key established via the key establishment procedure.

In an eight aspect, the disclosure provides that the first data packet is cryptographically secured based on the second stream identifier.

In a ninth aspect, the disclosure provides that the first stream identifier is associated with a device identifier.

In a tenth aspect, the disclosure provides that the device identifier is a globally unique identifier (GUID).

In an eleventh aspect, the disclosure describes a device for internet of things (IOT) discovery. The device includes a processor and memory in electronic communication with the processor, wherein the instructions are executable by the processor to receive a discovery packet from a device, wherein the discovery packet comprises a first stream identifier and a request to establish a second stream, identify a registration associated with the device based on the first stream identifier, determine a destination for the second stream based on the request to establish the second stream, send a stream acceptance packet to the device, wherein the stream acceptance packet comprises the first stream identifier and an input for generating a second stream identifier, add a first association to the registration based on the request to establish the second stream, wherein the first association is between the second stream identifier and the destination, receive a first data packet from the device, wherein the first data packet comprises the second stream identifier, and send the first data packet to the destination based on the first association in the registration.

In a twelfth aspect, the disclosure provides that the instructions are further executable by the processor to determine whether the first stream identifier exists in the registration.

In a thirteenth aspect, the disclosure provides that the instructions are further executable by the processor to disregard the discovery packet when the first stream identifier does not exist in the registration.

In a fourteenth aspect, the disclosure provides that the instructions are further executable by the processor to process the discovery request when the first stream identifier exists in the registration, and accept the request to establish the second stream when the first stream identifier exists in the registration.

In a fifteenth aspect, the disclosure provides that the input initiates a key establishment procedure with the destination.

In a sixteenth aspect, the disclosure provides that the key establishment procedure is a Diffie-Hellman key exchange.

In a seventeenth aspect, the disclosure provides that at least a portion of the second stream identifier is a secure key established via the key establishment procedure.

In an eighteenth aspect, the disclosure provides that the first data packet is cryptographically secured based on the second stream identifier.

In a nineteenth aspect, the disclosure provides that the first stream identifier is associated with a device identifier.

In a twentieth aspect, the disclosure provides that the device identifier is a globally unique identifier (GUID).

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
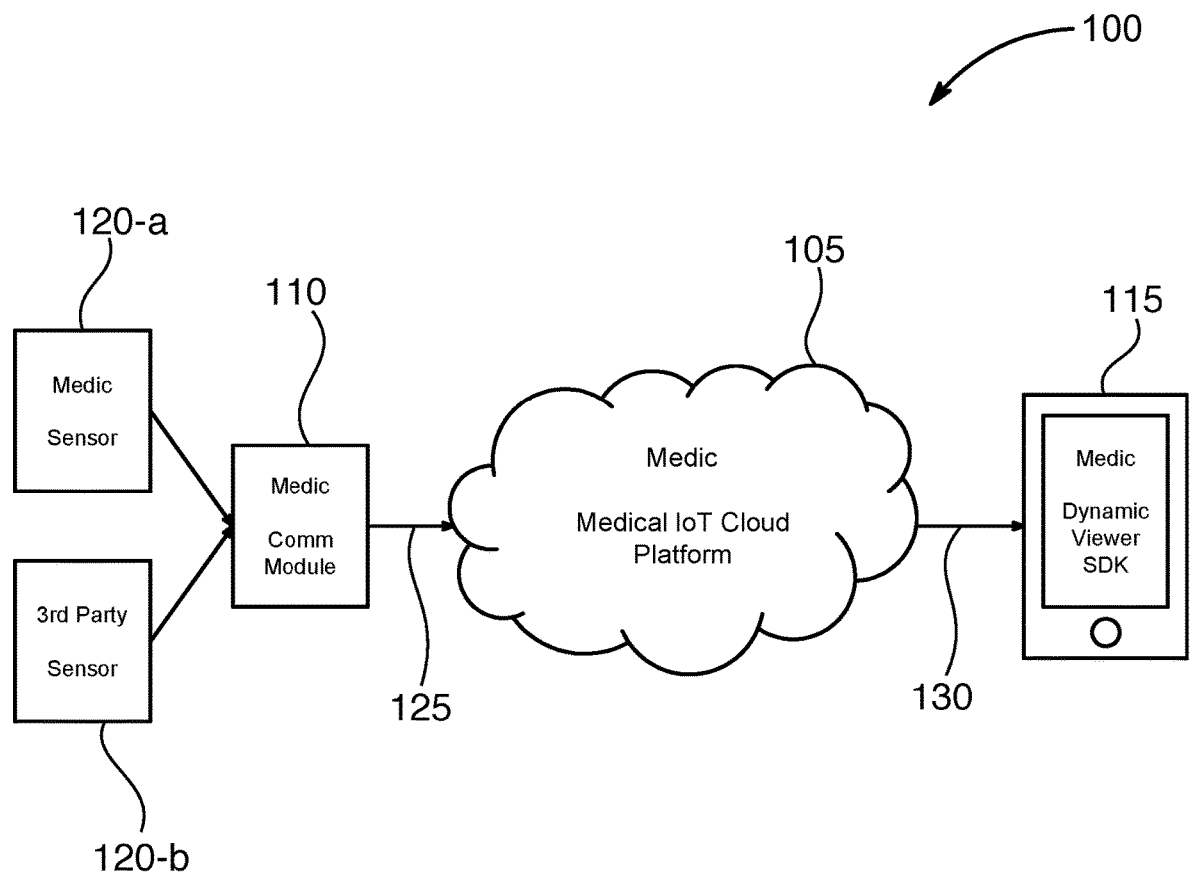
FIG. 1 is an exemplary environment of an environment in which the described systems and methods may be implemented.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

Internet of Things (IoT) devices (e.g., medical IoT devices) are difficult to discover and are often insecure. IoT devices typically fall into one of two categories, those that do not connect directly to the internet and those that connect directly to a manufacturers cloud server.

For those IoT devices that do not connect directly the Internet, the IoT devices are typically visible on the local network and are generally insecure, relying on the network's firewall as the security (which often lacks strong security, unfortunately). These types of devices are not easily discoverable and typically must be managed individually by a computer that is connected to the same local network. To view and manage multiple IoT devices in a central location often requires setting up third-party tools that need to be configured manually for each device.

For those IoT devices that do connect directly to the Internet, the IoT devices often connect directly to the manufacturers cloud server and typically only integrate with the manufacturer's website or mobile app. So, these types of devices are generally not discoverable or manageable without utilizing the manufacturer's website or mobile app.

Thus, plug and play discoverability of an IoT device (e.g., a medical IoT device) with a cloud server doesn't exist, and secure aggregation of data from medical IoT devices to a cloud server for viewing and computation (e.g. machine learning and data science) is difficult to set up, and is sometimes not even supported.

The described devices, systems, and methods enable IoT devices to be auto discoverable and plug and play with a cloud server. For example, the described devices systems, and methods enable medical IoT devices, sensors, and communication modules to be auto discoverable by a platform level service (e.g., the Medic Cloud Platform).

Each device, sensor, and communication module may have a globally unique identifier (GUID) that is set at manufacturing and is known by the platform level service. This means that as soon as a device or sensor is connected to the internet, either by itself or through a communication module, it registers with the platform level service for immediate data streaming.

Additionally, whenever a new capability is added to a device (i.e., another sensor is attached to the device or a firmware update is pushed to the device), each new capability (e.g., streaming capability) is auto-discovered by the platform level service (e.g., Medic Cloud) for data streaming.

As described herein, a proprietary protocol may be used for device discovery and registration with the platform level service. This protocol enables the discovery of devices, sensors, and device capabilities.

Each device and sensor may be associated with one or more destinations or viewers (e.g., web service that enables a user interface (UI) component to visually render a data stream). In one example, the UI component is available through a software development kit (SDK) for web, iOS, and Android). In this example, the SDK is not a stand-alone application that requires users to use a specific manufacturer's website or download a specific manufacturer's mobile app. Instead, the SDK provides feature rich, pre-configured view components that may be available to embed into other applications.

It is anticipated that IoT devices, sensors, and communication modules are built using the most up to date security standards. Embedded hardware includes encryption modules to encrypt both peer-to-peer and cloud communication. All cloud communication (data in flight) may be sent over Hypertext Transfer Protocol Secure (HTTPS). It is anticipated that data is encrypted at rest in the platform level service. This means that all data (e.g., medical data) is encrypted and secure, end to end, from the sensor, to the cloud, to the viewer, without any additional setup or provisioning.

FIG. 1 is an exemplary environment of an environment 100 in which the described systems and methods may be implemented. The environment 100 includes a first sensor (e.g., Medic sensor) 120-a, a second sensor (e.g., 3$^{rd}$ Party sensor) 120-b, a communication module 110, a cloud that hosts a platform level service (e.g., Medical IoT Cloud Platform) 105, and a mobile device 115.

The first sensor (e.g., transducer) 120-a and the second sensor (e.g., transducer) 120-b are connected to the communication module (e.g., node) 110. In some embodiments, the first sensor 120-a and/or the second sensor 120-b and the communication module 110 may be integrated into a single package. In other embodiments, as shown, the first sensor 120-a and/or the second sensor 120-b may be packaged separately from the communication module 110 and may connect to the communication module 110 via wired or wireless connections.

The communication module 110 may package data in a packet (e.g., datagram, MITP packet) from one or more of the first sensor 120-a and the second sensor 120-b for communication to the platform level service 105. With the sensor devices 120 providing constant sensor data, the communication module 110 may provide a stream of packets (e.g., a data stream) for each data type of information provided by the sensor(s) 120. The communication module 110 may communicate with the platform level service 105 via one or more networks (local networks, the Internet, for example) 125.

The platform level service 105 may automatically discover the communication module 110 and each of the data streams (from the first sensor 120-a and/or the second sensor 120-b) from the communication module 110 and may automatically provide each data stream to an appropriate viewer (e.g., web service) that enables the mobile device 115 to view a representation of the data via a dynamic viewer SDK. The mobile device 115 (which alternatively could be any computing device that can execute the dynamic viewer SDK, for example) may be connected to the platform level service 105 via connection 130 (e.g., the Internet).

By automatically discovering IoT devices (e.g., communication module 110) and automatically configuring the routing of each data stream to the appropriate viewer destination, enables IoT devices to be completely plug and play. In other words, each IoT may be discovered and each data stream may automatically be provisioned (e.g., configured and routed) to an appropriate viewer so that data is automatically viewable in connection with the device discovery.

Modern smart systems often contain many (e.g., tens, hundreds, thousands, etc.) of sensors and actuators. Collecting high quality, reliable data from each of these sensors, and providing command and control functionality is a non-trivial process. These challenges are amplified when the data is sensitive (e.g., medical data), and strict adherence to privacy and data security requirements is necessary.

The described systems, devices, and methods enable automatic discovery of the IoT devices as well as automatic provisioning and routing of data streams from an IoT device to appropriate viewers that enable viewing of the data in a consumable format.

It is anticipated that IoT devices utilize a modular set of hardware and firmware that standardizes the generation and delivery of data across a local or distributed network of nodes to the platform level service while maintaining data quality, reliability, and security. Each data stream (corresponding to a particular type of measurement (e.g., weight, temperature, humidity, for example) is harvested, aggregated, and packaged together in a payload that is individually addressed by, and optionally secured (e.g., encrypted) with, a token that together with the payload form a datagram. This datagram forms a functional unit that can be transmitted securely across the network.

The datagram may be transmitted individually or may transmitted together with one or more other datagrams (of the same or different type). In some embodiments, the datagram may be further packaged (e.g., in a frame, such as in a Transport Control Protocol/Internet Protocol (TCP/IP) frame) alone or with one or more other datagrams (of the same or different type). Regardless of the number of intervening nodes, network hops, additional packaging/repackaging, each datagram is a fundamental unit, which when cryptographically secured using a token based on a shared secret known only by the originating node and the destination node, is also cryptographically secured between the originating node and the destination node.

As used herein, modular electronic hardware will be referred to as a node (e.g., a Medic Information Node Interface (MINI) node). A node includes a transducer interface, a microcontroller, and communication module. The microcontroller obtains a first stream of data elements from a transducer (e.g., sensor) via the transducer interface, identifies a first data type associated with the first stream of data elements, harvests each data element (e.g., measurement) from the first stream of data elements based on the first data type, aggregates a plurality measurement into an array of measurements, generates a payload that includes a length identifier, a data type identifier (e.g., the first data type, in this example), and the array of measurements, identifies a destination for the payload, determines a token based on the identified destination, adds the identified token to the payload to form a standardized datagram (e.g., Medic Information Transport Protocol (MITP) datagram), and sends the datagram to the communication module for transmission to the destination (e.g., a separate node, platform level service, web service, and the like).

Figure 2:
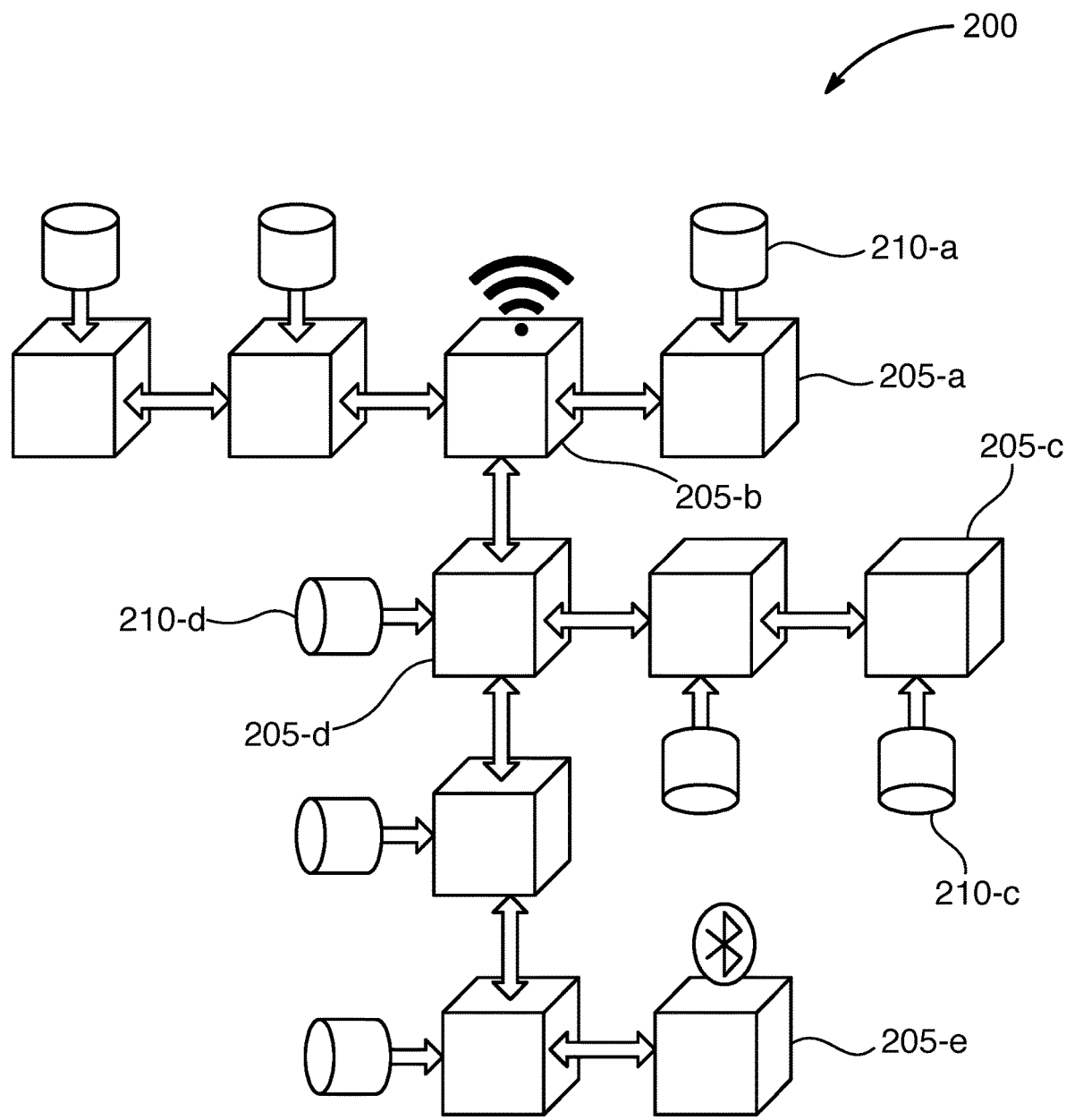
FIG. 2 is an exemplary environment of a network in which the described devices, systems, and methods may be implemented.

FIG. 2 is an exemplary environment of a network 200 in which the described devices, systems, and methods may be implemented. The network 200 includes multiple nodes 205 (e.g., communication module 110, platform level service 105) that are connected via a combination of daisy chain and star topology. For example, node 205-a is connected to node 205-b in a daisy chain topology, while node 205-b is connected to node 205-a and node 205-d (and another node) in a star topology.

Nodes 205 may perform different functionality based on use case and/or design. For example, nodes 205-a, 205-c, and 205-d are each coupled to a respective transducer (e.g., transducer 120-a, 120-b, 210-a, 210-c, and 210-d, while node 205-b may be coupled to and/or provide a Wi-Fi bridge to Wi-Fi networks and node 205-e may be coupled to and/or provide a Bluetooth bridge to Bluetooth connections/networks.

In network 200 (e.g., network 125), each node 205 is able to interact any of the other nodes 205 in the network 200 using various discovery/communication protocols. Because there is no defined structure to the network 200, data flow has no deterministic path (is not required to funnel to any one particular node 205).

Routing in network 200 is enabled using tokens. Often routing and security are handled separately (with security being an optional additional layer to the routing function, for example). In network 200, tokens can be static (which provides no security function, for example) or may by cryptographically secured (based on a shared secret between two nodes 205, for example)(which integrates routing and security together to secure both the routing information and the payload information, for example). This approach is described herein as "token secured routing."

Token secured routing is a protocol that integrates network routing and security into a unified paradigm. Token secured routing provides facilities for constructing and deconstructing network connections, facilities for identity verification, and facilities for information management. All of these facilities as well as other capabilities are created with security mechanisms integral to every step governing network traffic. Despite these capabilities, network 200 remains flexible and easy to use. For example, a node 205 with proper credentials will not notice any change in performance but will observe greater control over the node's own data and privacy. While a node without proper credentials will be unable to traverse the network 200.

In token secured routing, each point to point communication between two adjacent nodes 205 is governed by a token protocol that is specific to only those two adjacent nodes 205. As a result, a new token (e.g., a token specific to the next two nodes) must be generated at each node 205 for the next hop in the network 200 (with the exception of non-secured messages, and/or static routes, for example). Because routing and security are both based on the token being used, both routing and security are enforced at each hop (e.g., step/node 205) in a communication route. This provides numerous features on both the routing side and the security side.

For example, on the routing side, these features include enabling flexible topologies, supporting multi-path, enabling a self-discoverable network, enabling an ad hoc network, enabling a self-healing network, enabling a supernet (built on top of the internet, for example), providing a flexible implementation that can be adapted to run at the link layer, the transport layer, or the application layer, using multiple tokens to create layered routes and permission structures, providing traceability, providing auditable route tracing, and preventing circular routing without a time to live (TTL) field.

For example, on the security side, these features include providing routing transport control, providing identity of origin authentication, providing identity of destination authentication, facilitating reputation based trust augmentation, providing node-to-node guaranteed encryption, providing per-packet authorization, providing data/connection owner identification, providing non-repudiation of delivery, providing non-repudiation of transmission, providing inherent blocking of unauthorized access, and providing per socket access control.

The creation of a token secured channel between two nodes 205 results in the addition of one or more entries in an inbound routing table and/or an outbound routing table of the originating node 205, the destination node 205, and any intervening nodes 205. In some embodiments, these inbound routing tables and/or outbound routing tables are managed by a packet router and firewall within the node 205.

In one example, transducer 210-c (e.g., a photoplysmography (PPG) sensor) provides multiple different types (e.g., data types) of information (e.g., heart rate, blood pressure, blood oxygenation, etc.). Each of these different types of data (e.g., streams of data) may be obtained by the node 205-c. The node 205-c harvests each different stream of data elements separately resulting in separate datagrams for each different stream. The different datagrams may have different destinations (based on the token used, for example). In some embodiments, the datagrams may have a platform level service (e.g., platform level service 105) as the destination. The platform level service 105 may be a node 205 in network 200 or may be a node 205 that is outside of network 200 (e.g., in another network of nodes 205) but that is accessible via a TCP/IP bridge (via node 205-b, for example), which enables access to the other network of nodes 205.

In this example, a datagram associated with a first stream of data elements (e.g., heart rate) may have a platform level service (e.g., a server or node 205 outside of network 200, for example) as the destination (which is accessed via node 205-b, for example). In this example, the originating node 205-c and the platform level service may have a token based on a shared secret between the node 205-c and the platform level service. Each datagram generated for the first stream of data elements includes and is routed based on this cryptographically secured token via a data path that includes node 205-d and node 205-b. Although each intervening node 205 (e.g., nodes 205-d, 205-b) may have inbound/outbound routing table entries that enable routing of each datagram to the platform level service, only node 205-c and the platform level service may decrypt the payload of the datagram (using the shared secret, for example) enabling secure communication between the originating node 205 and the destination for each individual stream of data elements.

Continuing with this example, a second stream of data elements (e.g., blood pressure) from node 205-c may have node 205-d (which may perform additional processing, for example) as the destination. Similarly, each datagram generated for the second stream of data elements includes a cryptographically secure token associated with node 205-d. Accordingly, each different type of data stream (e.g., stream of different type of data elements) is independently packaged, secured, and destined to provide reliable and secure communication.

Figure 3:
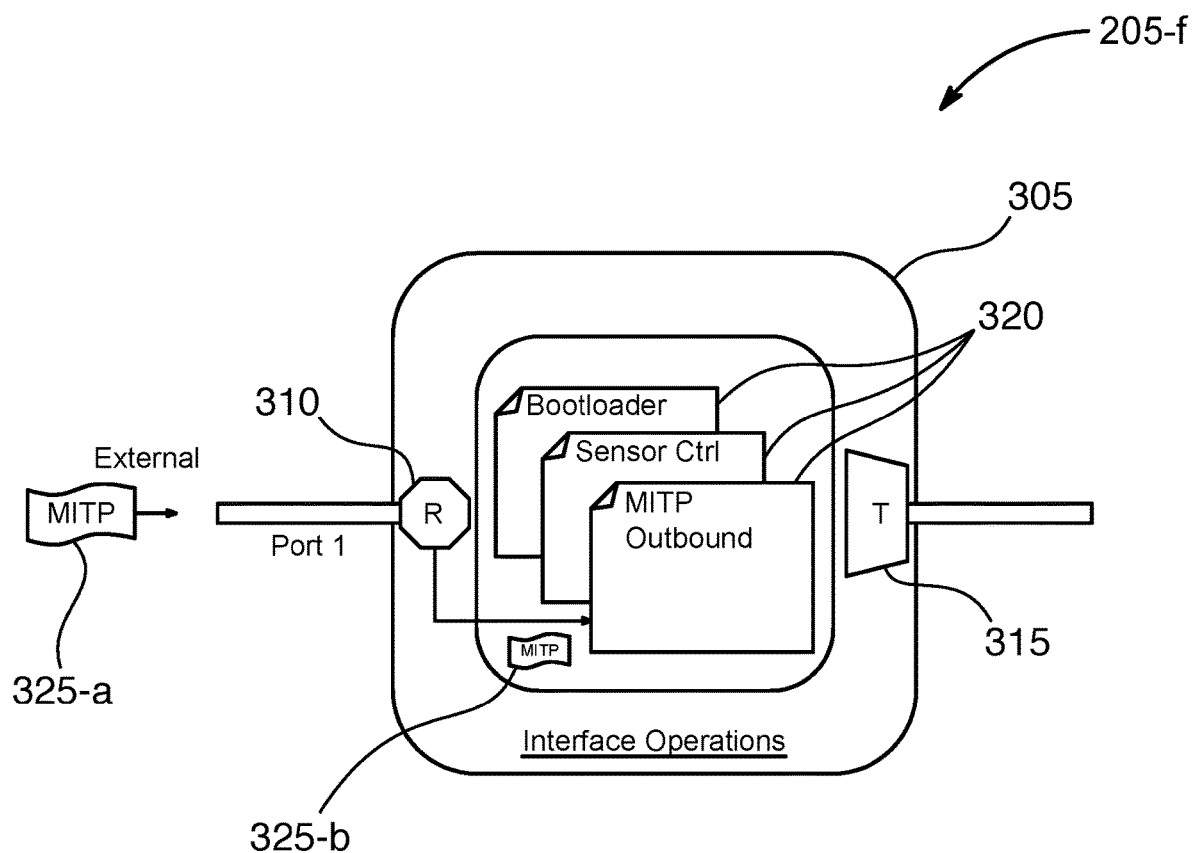
FIG. 3 is an exemplary embodiment of a node.

FIG. 3 is an exemplary embodiment of a node 205-f. The node 205-f is an example of any of the nodes 205 in network 200. Node 205-f includes a modular hardware/firmware package that provides an interface operations layer 305 that surrounds (providing a protective boundary, for example) to one or more applications 320.

Access to the interface operations 305 and to the one or more applications 320 is governed by a routing function 310. The routing function 310 includes an inbound routing table that maps inbound tokens to defined destinations (e.g., to one of the applications 320 or to a token in the outbound routing table) and an outbound routing tables that maps outbound tokens to defined destinations (e.g., a physical port with a particular port number). For example, the inbound routing table may have a unique destination address for each of the applications 320.

The routing function 310 may operate on and all communication within network 100 may utilize a special packet format referred herein as a Medic Information Transport Protocol (MITP) packet 325. The format of an MITP 325 packet is discussed more specifically with regard to FIG. 4.

An MITP packet 325-a that is external to the node 105-f may be received by the node 105-f via a physical port (e.g., Port 1). The MITP packet 325-a includes a token and a payload. The routing function 310 compares the token in the MITP packet with the tokens listed in the in inbound routing table. If the token in the MITP packet matches a token listed in the inbound routing table then the token is forwarded (e.g., MITP packet 325-b) to the destination corresponding to the matching token. If, however, the token in the MITP packet does not match any of the tokens listed in the inbound routing table then the token is ignored or dropped. In this way, nodes 105-*f* are secured against unauthorized MITP packets (e.g., MITP packets having unrecognized tokens).

The one or applications 320 may perform specific functions. For example, there may be a bootloader application 320 that functionally enables the interface operations 305, a sensor controller 320 that harvests and generates sensor payloads, and an MITP outbound application that identifies tokens for outbound communications. As illustrated, the inbound routing table in the routing function 310 may route the token in the incoming MITP packet 325-*a* with the MITP outbound application 320, such that the MITP packet 325-*b* is routed from the routing function 310 to the MITP outbound application 320.

In some embodiments, each application 320 implements this same node 205-*f* function, including the interface operations and the routing functions described with respect to node 205-*f*. It is appreciated that the implementation of the node 205-*f* functions by an application 320 may be the smallest implementation of the node 205-*f* functions and those functions may be in their most simplified form (e.g., a single input (e.g., port) and a single output (e.g., port)).

The interface operations 305 may also include a transducer interface 315. The transducer interface 315 may receive the raw output of an internal or an external transducer (e.g., sensor). While much of the discussion herein relates to receiving data, such as the case when the transducer is a sensor (e.g., in input device), the transducer may alternatively be an actuator (e.g., an output device) and transducer interface sends commands to an internal or external transducer (e.g., actuator).

In some embodiments, a node 205-*f* may or may not be implemented in one single processor or package. In one example, each component (transducer, processor, and communication module) is implemented in software on the same microprocessor or microcontroller. In another example, a node 205-*f* may be electronically interconnected (as illustrated in FIG. 3, for example) with some or all the transducers connected externally (having external transducer circuitry, for example). In yet another example, the transducers, internal or external to the processor, may be interconnected with a communication module that is implemented externally to the transducer processor. For instance, the communication module may be implemented on a second processor, on a FPGA, as an ASIC, or other computing technology.

In some embodiments, a device (e.g., a Medic Device) is a system comprised of at least one node 205, connected to a network (e.g., network 200). The network may be a peer-to-peer, ad-hoc network, in which nodes may be added or removed without any centralized network configuration as discussed with respect to FIG. 2.

Figure 4:
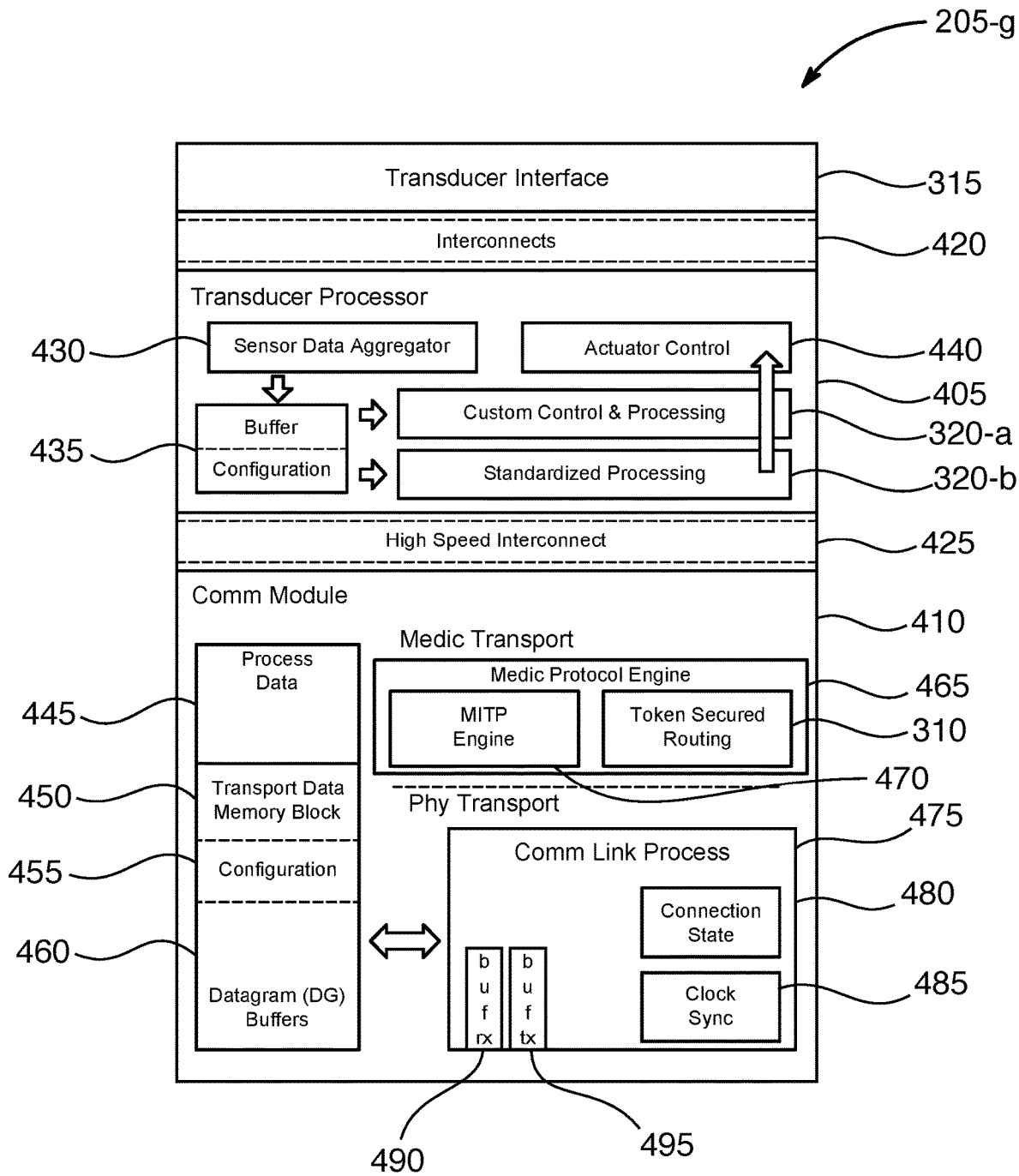
FIG. 4 is a block diagram illustrating one example of a node.

FIG. 4 is a block diagram illustrating one example of a node 205-*g*. The node 205-*g* is an example of any of the nodes 205 discussed in the foregoing Figures. It is appreciated that the node 205-*g* implements the interface operations 305 discussed with respect to FIG. 3.

A node 205-*g* includes a transducer interface 315 (for interfacing with one or more (internal or externally connected) transducers, a transducer processor 405, and a communication module/network module 410. The one or more transducers may be a logical, minimal grouping of transducers (e.g., sensors and/or actuators). The transducer processor 405 may be a microcontroller (MCU) or microprocessing unit (MPU).

The transducer processor 405 may include a sensor data aggregator 430 that collects and aggregates the sensor data and feeds the data (e.g., configuration data (e.g., data type information) and sensor data (e.g., data payload)) into a set of buffers 435. The transducer processor 405 includes one or more applications (e.g., applications 320) for handling and/or processing the data. For example, a standardized processing application 320-*b* (e.g., standard processing unit (SPU)) may handle data flow and standard processing and/or control steps (based on data type (e.g., DeviceType.DataType 535), for example) within the transducer processor 405 (to/from different applications (e.g., applications 320) within the transducer processor 405, for example) and via the interfaces (e.g., transducer interface 315 with the transducers and/or the communication module 410). One or more additional applications 320-*a* may provide custom processing and/or custom control functionality (including actuator control via actuator control 440, for example).

In some embodiments, data is distinguished based on data type (e.g., DeviceType.DataType 535). In the case that a TransducerID (e.g., transducer identifier assigned to a transducer by the node 205-*g*) is assigned exactly to one Medic Data Type (MDT), then data may be distinguished based on TransducerID. It is appreciated that a single transducer (having a single TransducerID, for example) may provide/output multiple different types of data types, so that, as used herein, data is distinguished based on data type to ensure that each data stream (associated with a different data type, for example) is handled independently and properly.

Alternatively, each physical transducer in the node receives at least one TransducerID enumeration. TransducerIDs are static, immutable, and locally unique. In these cases, a physical sensor may be associated with multiple TransducerIDs if multiple data from the sensor is collected at different rates or is associated with different data types. Virtual transducers may also be defined if additional processing data is available, for example from the Custom Control & Processing application 320-*a*. However, even in these embodiments, each TransducerID in the node 205-*g* is assigned exactly to one data type (e.g., Medic Data Type) (i.e., to ensure data distinction based on data type).

A memory buffer 435 in the Transducer Processor 405 is configured to store two copies of each output from each configured data type. The first buffer 435 is the read buffer and the second buffer 435 is the output buffer. Each buffer 435 has associated full/empty flags to govern access. For each element stored in the buffers 435, the local clock at the sample time is recorded. The standardized processing application 320-*b* (e.g., Standardized Processing Unit (SPU)) is configured to receive standard MDT payloads for Actuator Control 440 interface. Standard MDT payloads are copied directly to the configured interface. Additional complexity may be implemented in the Custom Control & Processing application 320-*a*.

The standardized processing application 320-*b* is configured to accept values for each transducer datum from either the data buffer or the custom control & processing application 320-*a*. The standardized processing application 320-*b* informs the Medic Protocol Engine (MPE) 465 of each configured MDT payload it may send to the MPE 465. Although the MPE 465 is illustrated in being in the communication module 410, in other embodiments the MPE 465 is included in the transducer processor 405 (as part of the interface operations 305 and/or as an application 320 within the interface operations 305, for example).

Figure 5:
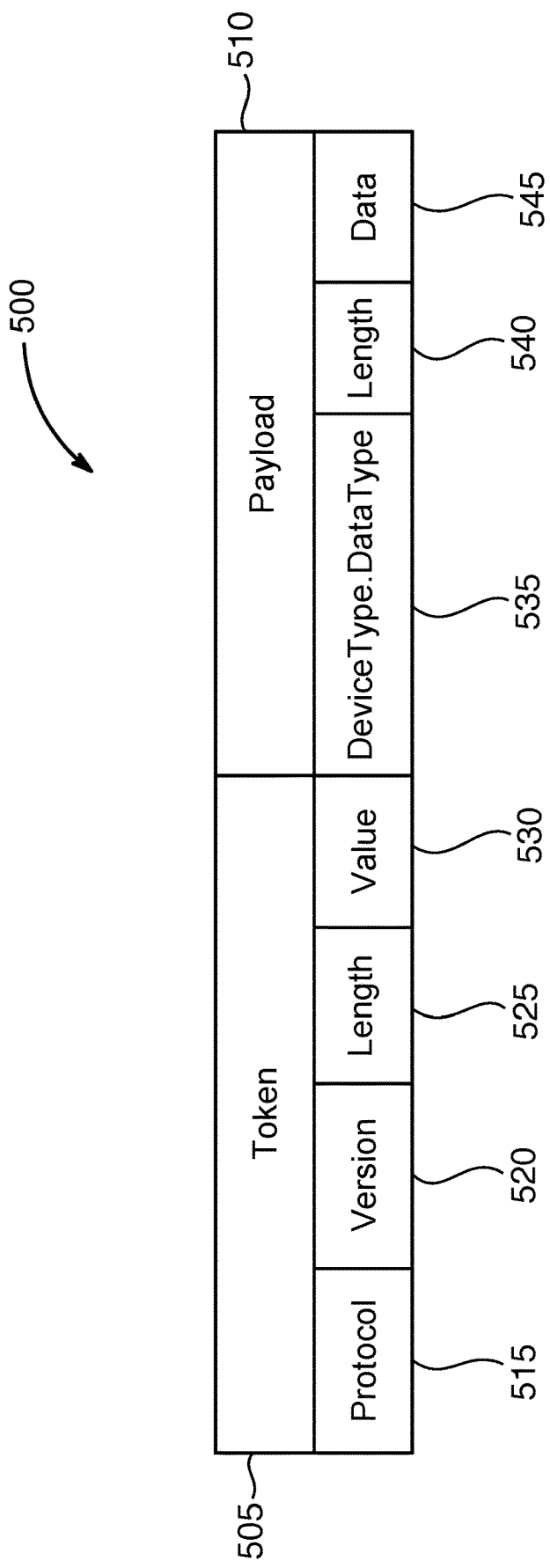
FIG. 5 is a block diagram illustrating one example of a packet.

As described more fully with respect to FIG. 5, each MDT payload may include the datatype, version, length, TransducerID, SamplePeriod, and/or SampleUnits. Depending on implementation, an MDT payload may be aggregated with other MDT payloads, which together form a single datagram, or may be transmitted individually, with a single MDT payload in each datagram. The token portion of the datagram, which identifies the intended destination network address for the datagram, is added to one or more MDT payloads to form the datagram (e.g., MIPT packet 325).

The transducer processor 405 (via a combination of the standardized processing application 320-b, the custom control processing application 320-a, and/or the Medic Protocol Engine (MPE) 465, for example) is configured to accumulate $M_t$ samples for each transducer, package those $M_t$ samples in an MDT payload, determine destination information (e.g., token information), and generate a datagram (e.g., MIPT packet 325) for sending via the communication module 410.

The communication module 410 may be configured to support a particular version of the Medic Transfer Protocol. The communication module 410 is configured to support sending datagrams (e.g., MITP packets 325) of a particular frame size.

In one example, a unit data element is present on (i.e., provided to) the transducer interface 315. As the transducer processor 405 receives the data element, the transducer processor harvests the data element. In some embodiments, the data element may have a size of $N_t$ bits. The sensor data aggregator 430 copies the data element to its associated element (which aggregates the data elements into an array of $M_t$ elements, for example) in the input data buffer 435 and records the local clock time in the associated field (e.g., timestamp field).

For each data type in turn, governed by the data type sample rate, the standardized processing application 320-b gathers each datapoint (e.g., data element) in the associated MDT payload to the output buffer 435. For each MDT payload in the output buffer 435, if the "ready" flag is set, the standardized processing application 320-b transfers the MDT payload (e.g., data record (with local clock values)) to the MPE 465 using a predefined special purpose Medic Datagram.

The Medic protocol engine 465 receives the special purpose Medic Datagram. In some embodiments, the Medic protocol engine 465 (via the MITP engine 470, for example) analyzes the local clock values to ensure that sampling requirements have been met. The MITP engine 470 identifies a token (using the token secured routing function 310, for example) associated with the destination of the MDT payload. For instance, the MITP Engine 470 identifies the destination node and refers to the outbound routing table maintained by the token secured routing function 310 to identify the token to use of that identified destination node. The MITP engine 470 packages the MDT payload with the identified token (and its associated header information, for example) to generate a datagram (e.g., MITP packet 325). This new datagram is stored in a frame buffer (not shown). At regular intervals, or when the frame buffer reaches a maximum frame size, the MITP engine 470 provides the datagram to the communication link process 475 in the communication module 410.

The Medic protocol engine 465 may utilize process data 445, transport data 450, configuration information 455, to generate a datagram (which is packaged together in the datagram buffers 460). Although each of these blocks is shown as being in the communication module 410, it is appreciated that in other embodiments, each of these blocks, including the Medic protocol engine 465 are in the transducer processor 405 (implemented via the interface operations 305 and/or in one or more applications 320, for example). The process data 445 may be the state machine associated with the token state of a connection between two nodes 205 (as governed by the MITP engine 470, for example). The transport data memory block 450 may store parameters (e.g., token protocol, packet length, etc.) associated with properly formatting the frame associated with the datagram. The configuration 455 may store payload types and formats as well as data type configuration parameters so that datagrams (e.g., MITP packets 325) may be generated in a standardized form (according to the Medic Transport Protocol, for example).

The communication link process 475, which handles the link layer and physical layer transport of the datagram (e.g., MITP packet 325) transfers the frame (e.g., datagram) to an external node on/via the network (e.g., network 200). The external node may be the final destination of the datagram. The final destination may be a database, a platform level service, a web service, or another node (e.g., node 205, a MINI). In some embodiments, the external node 205 may be a Medic Aggregator or Gateway, which packages many datagrams for transport downstream. The communication link process 475 includes a connection state 480 which establishes and maintains a connection state with a one or more nodes in the network (e.g., network 200). The clock sync 485 may ensure proper communication timing for communication on the network. Additionally, the communication link process 475 includes a transmit buffer 495 and a receive buffer 490 for enabling communication via the network.

In some embodiments, the medic protocol engine 465 provides the transport control layer of the communication stack. Accordingly, MITP packets 325 (e.g., datagrams) may be transported over a wide variety of networks while maintaining the same end-to-end token-based security.

For example, when the communication link process 475 is connected to an Ethernet/TCP/IP network, the node 205-g will join the IP network using standard internet tools. In this example, data destination IP addresses and/or domains and credentials may be pre-programmed.

In another example, when the communication link process 475 is connected to a Medic LAN, the node 205-g is discovered by the rest of the network (e.g., network 200) when it sends a NodeHello Medic datagram. In this example, the Medic LAN may have at least one gateway device (e.g., a device that enables access to a platform level service). The gateway device may respond to a NodeHello by sending a GatewayHello Medic datagram addressed to the new node 205-g. In some embodiments, if the node 205-g does not receive a GatewayHello datagram, it concludes that it is not on a Medic LAN. In some embodiments, media addresses on the Medic LAN are derived from the first 48 bits of the globally unique identifier (GUID) of the node (e.g., node 205-g).

The NodeHello packet may contain the full GUID of the node, the maximum data frame size the node will send, and the node's associated data type. On collision (e.g., collision of media address) detection, the affected nodes may derive a new media address by performing a bit shift operation on the GUID. This operation may be repeated until the collision is eliminated.

In some embodiments, all datagrams (e.g., Medic datagrams) are encrypted prior to transport over a network (e.g., network 200). This encryption enables secure data communication regardless of the number of path between the originating node 205 and the destination node 205.

In some embodiments, a node (e.g., node 205-g) may require input from a datagram (i.e., the MDT payload) generated by another node on the local area network (LAN). In these cases, a node with an external MDT payload dependency may send a NodeWho Medic datagram. This NodeWho Medic datagram may be broadcast to the network, may contain a list of MDT values that are requested, and may contain an authentication token that authorizes access of the list. A node that supports the requested MDT value may respond with a NodeConfig datagram (e.g., message) that lists support for the specified protocol(s). A NodeConfig datagram is addressed to the node that issued the corresponding NodeWho datagram.

In this, as in the case of all secure token generation (that is based on a shared secret between the two nodes, for example) the two nodes complete a handshake and token generation process (via a Diffie-Helman exchange, for example). In this handshake and token generation process the two nodes confirm version compatibility, confirm datagram frequencies, confirm any timing requirements are met, registers the dependency (e.g., makes the appropriate inbound routing table and/or outbound routing table additions) at each node, verifies and establishes controls for data access restrictions, and establishes encryption and authentication protocols for transmitted data between the two nodes using the generated tokens.

FIG. 5 is a block diagram illustrating one example of a packet 500. The packet 500 (also referred to herein as datagram 500, MIPT packet 325, and transducer datagram) includes a token portion 505 and a payload portion 510. Each of the token portion 505 and the payload portion 510 may include a small header section (e.g., protocol 515, version 520, length 525 in the token portion 505 and DeviceType.DataType 535 and length 540 in the payload portion 510) for providing configuration information in addition to the token value 530 in the token portion 505 or the data 545 in the payload portion 510.

In some embodiments, the token portion 505 includes a token protocol 515, a token version 520, a length 525, and a value 530 (e.g., public token value). The token protocol 515 may specify a routing and security model for the data packet. The token protocol 515 may indicate a secure or insecure procedure, a specific routing destination, a generic nearest-neighbor destination, a network traversal search, or a broadcast mode. The token version 520 may provide compatibility information on the selected token protocol 515. The token length 525 may specify the number of bytes in the token value 530. The token value 530 (e.g., public token) provides routing and security information per the token protocol 515.

In some embodiments, the payload portion 510 includes a DeviceType.DataType 535, a data length 540, and data 545. The DeviceType.DataType 535 may specify the type, class, and/or formatting of the data 545. The data length 540 may specify the number bytes in the data 545. The data 545 may be the actual data payload.

As noted above, data (e.g., data from transducers) is standardized as a datagram 500 (e.g., MITP packets 325). In some embodiments, the minimum datagram structure of a datagram 500 consists of 128 bits. Each datagram 500 includes a header (e.g., token 505) and a value (e.g., payload 510).

The header includes a length description (e.g., length 525) and the payload includes a data type identifier (e.g., DeviceType.DataType 535, medic data type (MDT) identifier (ID) MDT ID). It is appreciated that different data types require different handling and/or processing. Accordingly, all data is classified as one of a defined set of data types (e.g., Medic Data Type (MDT, DeviceType.DataType 535). In some embodiments, an MDT is a statically defined data structure of N bytes. It is appreciated that all MDTs are enumerated (with an MDT identifier (ID), for example) and registered with the platform level service (e.g., Medic network database that defines the Medic network transport layer protocol, for example). MDT IDs may have an associated version number (see Table 1).

The data 545 of the datagram 500 is based on the DeviceType.DataType 535 (MDT ID) identified in the payload 510 (e.g., header information of the payload 510). While a variety of MDT IDs are possible, the following discussion focuses on MDT IDs associated with transducers. In particular, the following discussion focuses on MDT IDs associated with transducers that provide data (e.g., sensors). Such datagrams 500 may be referred to as transducer datagrams. However, it is understood that datagram format may be uniform among all data types (e.g., MDT IDs) and that it is the identified data type (e.g., MDT ID) that distinguishes a transducer datagram from other datagrams (e.g., administrative datagram, control datagram, etc.).

The data 545 (e.g., value) of a transducer datagram 500 is an array of $M_t$ elements (e.g., data structures of size $N_t$), where $N_t$ is the number of bytes in the data structure (e.g., $M_t$ element) for a particular data type (e.g., DeviceType.DataType 535=t, and where each $M_t$ element (e.g., data element) represents a sensor reading/measurement at a particular time and/or location (as identified by a timestamp and/or geolocation pin, for example) for a particular data type (e.g., DeviceType.DataType 535). It is appreciated that in some embodiments, a data type may correspond with a particular transducer (having a TransducerID). However, in other embodiments a particular transducer may provide multiple different data types of information.

In some embodiments, an datagram 500 is structured as set forth in Table 1, below, with the header portion of the payload 510 being expanded (beyond just the DeviceType.DataType 535 and length 540 as illustrated in datagram 500, for example) to include any or all of the fields identified in Table 1.

As illustrated in Table 1, the datagram 500 includes payload header information including length (e.g., length 540), datatype (e.g., DeviceType.DataType 535, MDT ID), version (e.g., MDT ID version), TransducerID (e.g., the ID associated with the transducer that is supplying the data stream), sample period (e.g., the time interval separating each sample value (e.g., $M_t$ element), sample units (e.g., encoding for sample period units), sample error (e.g., sample rate error detected), and timestamp (e.g., Unix timestamp for the datagram 500, and a data payload or value field (e.g., data 545) that includes the array of $M_t$ elements that are each $N_t$ bytes.

TABLE 1

| Field | Size (bits) | Description |
| --- | --- | --- |
| Length | 16 | Number subsequent bytes in datagram |
| Datatype | 16 | Medic Data Type ID |
| Version | 8 | Datatype version number |
| TransducerID | 8 | 256 possible transducer elements |
| SamplePeriod | 13 | Time interval separating each value |
| SampleUnits | 2 | Encoding for sample period units |
| SampleError | 1 | Sample rate error detected |
| Timestamp | 64 | Unix timestamp |
| Value | $M_t \times N_t$ | Data payload; array; $M_t$ entries of $N_t$ bytes |

Figure 6:
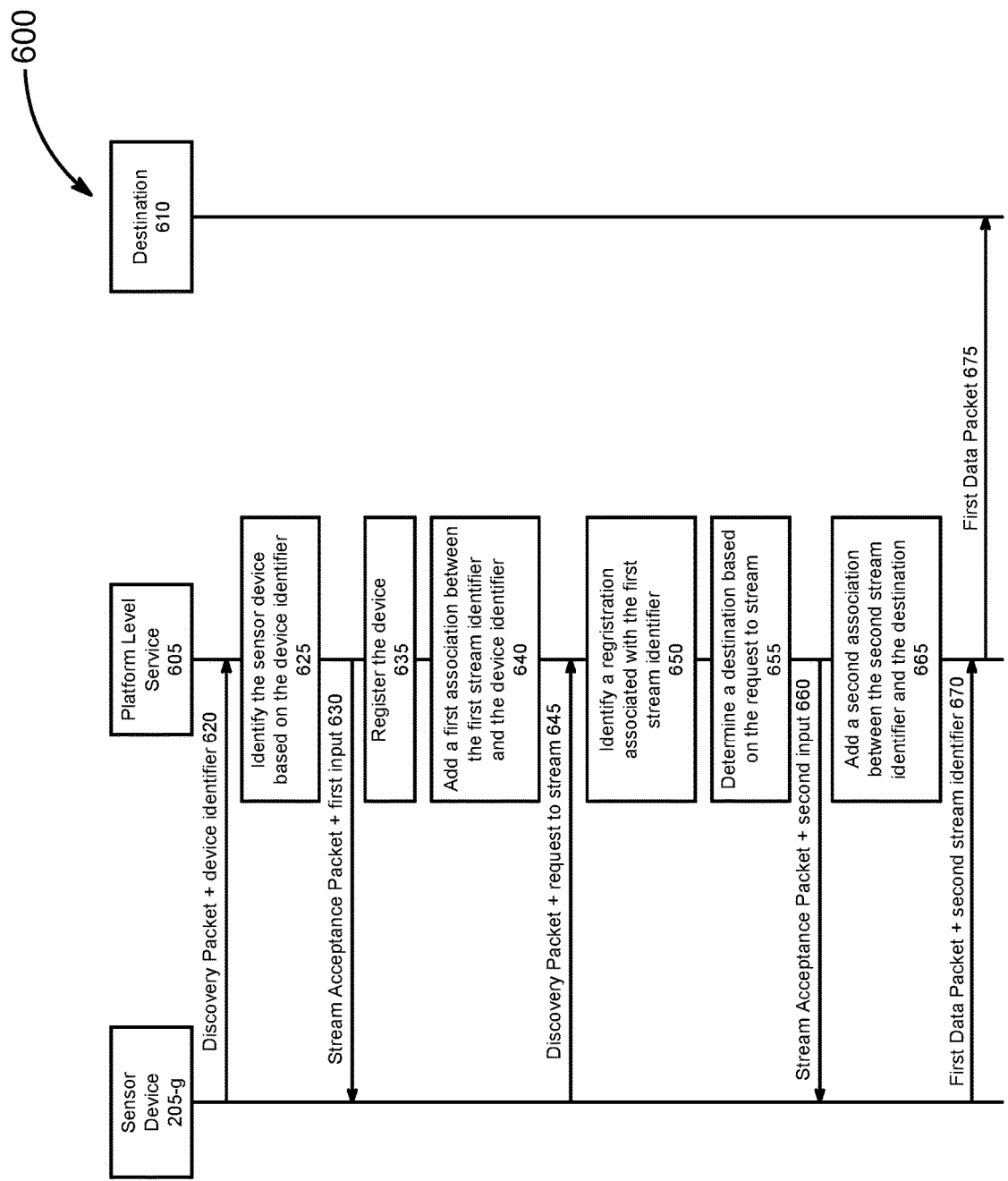
FIG. 6 is a message flow diagram illustrating the auto discovery process.

FIG. 6 is a message flow diagram illustrating the auto discovery process 600. The auto discovery process 600 is the result of an exchange of messages between the sensor device (e.g., node) 205-g and a platform level service 605 (e.g., platform level service 105). The result of the auto discovery process 600 is the automatic provisioning of data streaming to a viewer (as identified by the routing of data packets to the destination 610, for example).

The auto discovery process 600 begins with the sensor device 205-g sending a discovery packet 620 that includes the device identifier (e.g., GUID) of the sensor device 205-g to the platform level service 605. The platform level service 605 receives the discovery packet 620 and identifies 625 the sensor device 205-g based on the device identifier. Upon identifying the sensor device 205-g, the platform level service 605 sends a stream acceptance packet 630 to the sensor device 205-g. The stream acceptance packet 630 includes a first input for establishing a shared secret between the platform level service 605 and the sensor device 205-g. Based on the shared secret between the platform level service 605 and the sensor device 205-g, the platform level service 605 and the sensor device 205-g may determine a first stream identifier. This first stream identifier may correspond to a device specific (e.g., based on device identifier), token secured route between the sensor device 205-g and the platform level service 605.

The platform level service 605 registers 635 the sensor device 205-g. In some embodiments, this includes creating a registration for the sensor device 205-g. The registration may include the device identifier (e.g., GUID) of the sensor device 205-g.

The platform level service 605 adds 640 a first association between the first stream identifier and the device identifier. This includes adding the first streaming identifier to an inbound routing table in a token secured routing function (e.g., token secured routing function 310). In some cases, this also includes adding the first stream identifier (e.g., token) to the registration maintained for the sensor device 205-g (the registration that is associated with the device identifier for the sensor device 205-g, for example).

Following the establishment of a token secured connection between the sensor device 205-g and the platform level service 605, the sensor device 205-g may send datagrams (e.g., datagram 500) to the platform level service 605 using the first streaming identifier.

The sensor device 205-g may send a discovery packet 645 that includes a request to stream. The discovery packet 645 is token secured using the first streaming identifier. The platform level service 605 receives the discovery packet 645 that includes the request to stream. The platform level service 605, identifies 650 a registration associated with the first stream identifier and verifies the legitimacy of the discovery packet 645 based on the first streaming identifier being in the registration. Because the first streaming identifier is registered with the platform level service 605 (i.e., there is a registration associated with the device identifier of the sensor device 605-g) the inbound routing table of the token secured routing function of the platform level service 605 will allow the platform level service 605 to process the discovery packet 645 with the stream request. The platform level service 605 may evaluate the request to stream information, including a data type associated with the request to stream and determines 635 a destination (the destination of an appropriate viewer, for example) based on the request to stream. For example, the platform level service 605 determines a destination 610 that is configured to process, manipulate, and/or graphically render the data into a format that allows for easy consumption of the data. It is appreciated that different data types may be associated with different types of graphical representations that are particularly suited for graphically rendering that data type, so as to maximize ease of accessibility and/or usability of graphically rendered data.

The platform level service 605 sends a stream acceptance packet 660 to the sensor device 205-g. The stream acceptance packet 660 includes a second input for establishing a new (e.g., second) shared secret between the platform level service 605 and the sensor device 205-g. This new shared secret is specific to the streaming request and is separate/independent from the shared secret associated with the first stream identifier. Based on this new shared secret between the platform level service 605 and the sensor device 205-g, the platform level service 605 and the sensor device 205-g may determine a second stream identifier. This second stream identifier corresponds to the particular request to stream and results in a stream specific token secured route between the sensor device 205-g and the platform level service 605.

The platform level service 605 adds 665 a second association between the second stream identifier and the determined destination. In some embodiments, the determined destination is identified by a token state (e.g., stream identifier) established between the platform level service 605 and the destination 610. As noted previously, the platform level service may add this second association to an inbound routing table associated with the token secured routing function. The sensor device 205-g similarly determines the second stream identifier and associates that stream identifier (e.g., token state) with the destination (in an outbound routing table, for example) for streaming data associated with the request to stream.

The sensor device 205-g sends a first data packet 670 including and/or using the second stream identifier. The platform level service 605 receives the first data packet 670 and since there is the second association that routes the second stream identifier to the destination (as set forth in the inbound routing table, for example), the platform level service 605, automatically routes/sends the first data packet 675 to the destination 610 (using the stream identifier established between the platform level service 605 and the destination 610, for example). It is appreciated, that any data packets that include/use the second stream identifier will automatically be routed securely to the destination 610 determined by the platform level service 605.

Thus, platform level service 605 may automatically register, determine proper destinations (of viewers, for example) and establish a streaming route for a particular data stream (e.g., data stream of a particular data type) through a simple auto discovery process 600 in which the sensor device 205-g simply needs to send a discovery packet 620 with a device identifier to register with the platform level service 605 and in which the sensor device 205-g simply needs to send 645 a discovery packet or with a request to stream to establish a full streaming solution to a destination 610 (e.g., viewer). It is appreciated that the heavy lifting of the discovery process and or stream establishment is handled by the platform level service 605. Accordingly, the burden to the sensor device 205-g is limited to sending a discover request and establishing a secure link via a shared secret with the platform level service 605.

Figure 7:
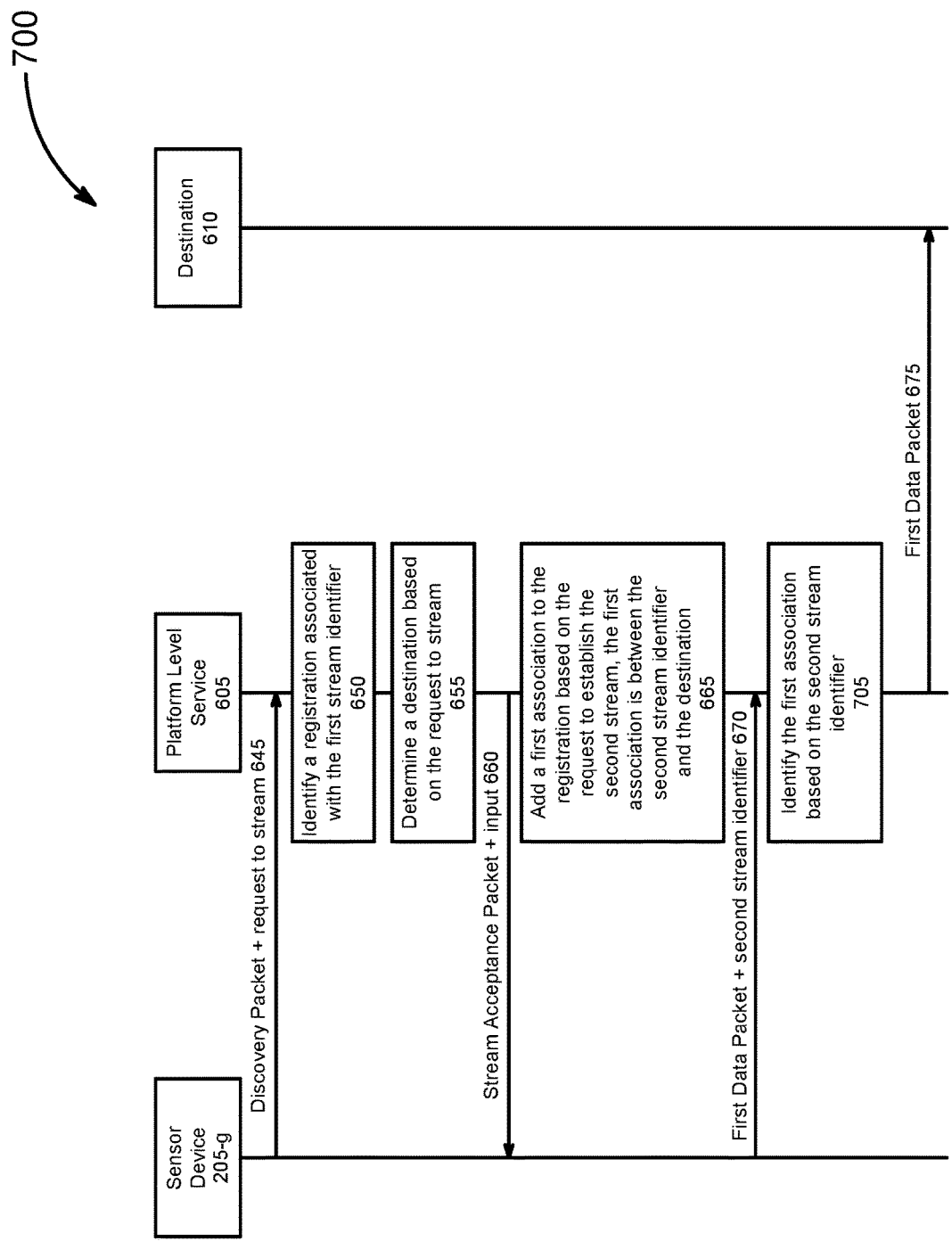
FIG. 7 is a message flow diagram illustrating the auto discovery process for streaming data to a destination.

FIG. 7 is a message flow diagram illustrating the auto discovery process 700 for streaming data to a destination. The auto discovery process 700 for streaming data is the result of an exchange of messages between the sensor device (e.g., node) 205-*g* and a platform level service 605 (e.g., platform level service 105). The result of the auto discovery process 700 for streaming data is the automatic provisioning of data streaming to a viewer (as identified by the routing of data packets to the destination 610, for example).

The auto discovery process 700 for streaming data begins with the sensor device 205-*g* sending the discovery packet 645 that includes a request to stream as discussed with respect to FIG. 6. It is appreciated that the discovery packet 645 includes and or is secured using a first stream identifier. It is this first stream identifier that provides identification and validation for accepting the request to stream. The platform level service 605 identifies 650 a registration associated with the first stream identifier and determines 655 a destination based on the request to stream as discussed with respect to FIG. 6.

The platform level service 605 sends a stream acceptance packet 660 that includes an input for establishing a shared secret (and a resulting stream identifier) between the sensor device 205-*g* and the platform level service 605. The platform level service 605 adds 665 a first association to the registration based on the request to establish the second stream. The first association is between the second stream identifier and the destination 610. This association may be maintained in an inbound routing table for token secured routing at the platform level service 605. With this first association and the second stream identifier established, the sensor device 205-*g* may simply stream the data stream associated with the request to stream.

The platform level service 605 receives a first data packet 670 that includes/uses the second stream identifier from the sensor device 205-*g*. The platform level service 605 identifies 705 the first association based on the second stream identifier. Based on this first association (as established in the inbound routing table, for example), the platform level service 605 routes the first data packet 675 to the destination as discussed with respect to FIG. 6. Based on the way token secure routing and the inbound routing tables work, as long as the inbound routing table includes the first association, any packet that includes/uses the second stream identifier will be routed to the destination 610.

It is appreciated that the sensor device 205-*g* may send a discovery packet with a request to stream (e.g., discovery packet with request to stream 645) for each different data stream (based on data type, for example) that the sensor device 205-*g* can provide. It is understood that each of these data stream will be associated with a unique stream identifier and that routing is enabled utilizing token secured routing.

Figure 8:
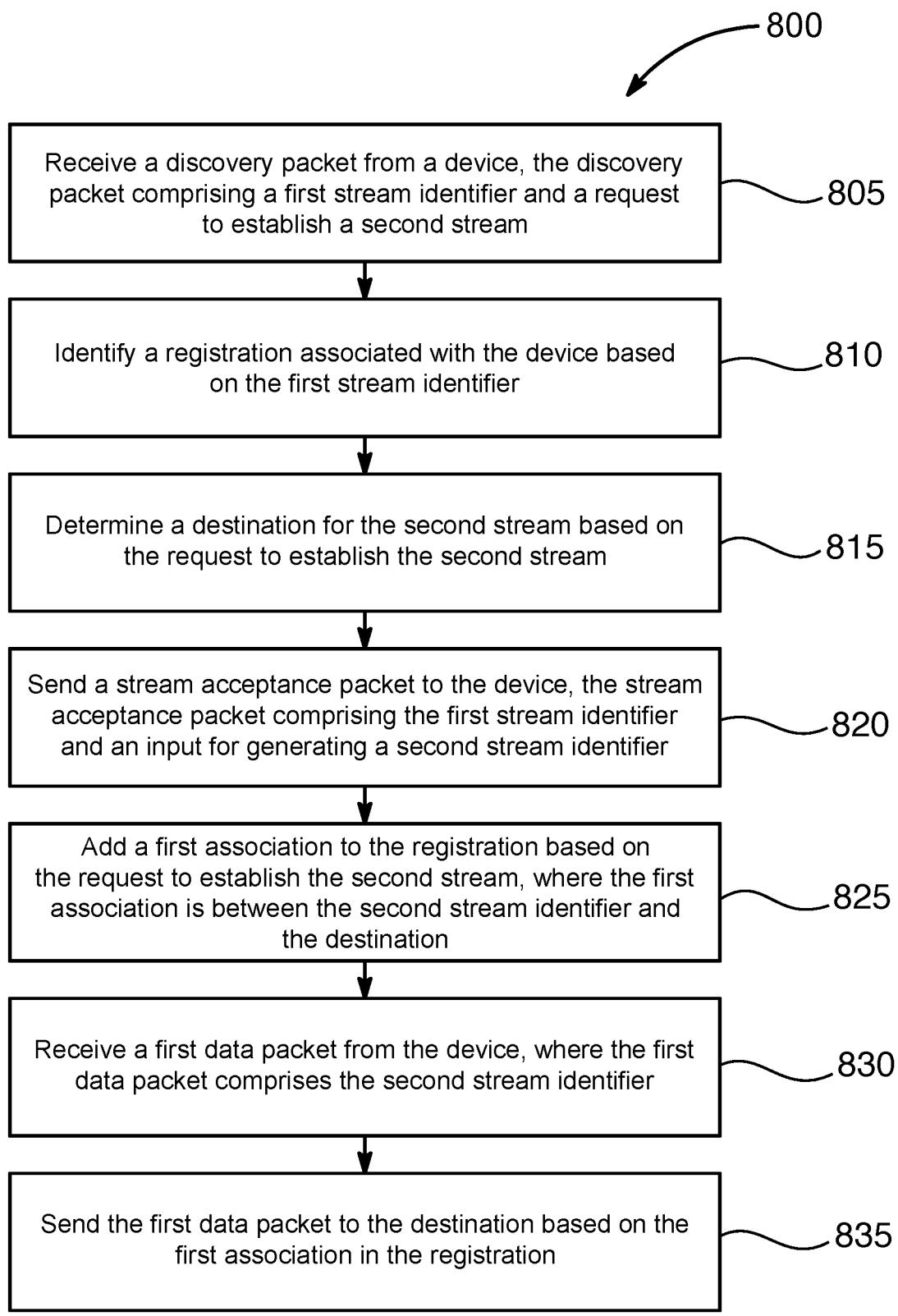
FIG. 8 is a flow diagram illustrating one example of a method for communicating data.

FIG. 8 is a flow diagram illustrating one example of a method 800 for auto discovery. The method 800 may be implemented by a node 205 and more specifically by the platform level service 105, 605 or an application specific processor (e.g., processor and memory) included within the node 205.

At 805, a discovery packet is received from a device. The discovery packet includes a first stream identifier and request to establish a second stream. At 810, a registration associated with the device is identified based on the first stream identifier. At 815, a destination for the second stream is determined based on the request to establish the second stream. At 820, a stream acceptance packet is sent to the device. The stream acceptance packet includes the first stream identifier and an input for generating a second stream identifier. At 825, a first association is added to the registration based on the request to establish the second stream. The first association is between the second stream identifier and the destination. At 830, a first data packet is received from the device. The first data packet includes the second stream identifier. At 835, the first data packet is sent to the destination based on the first association in the registration.

Figure 9:
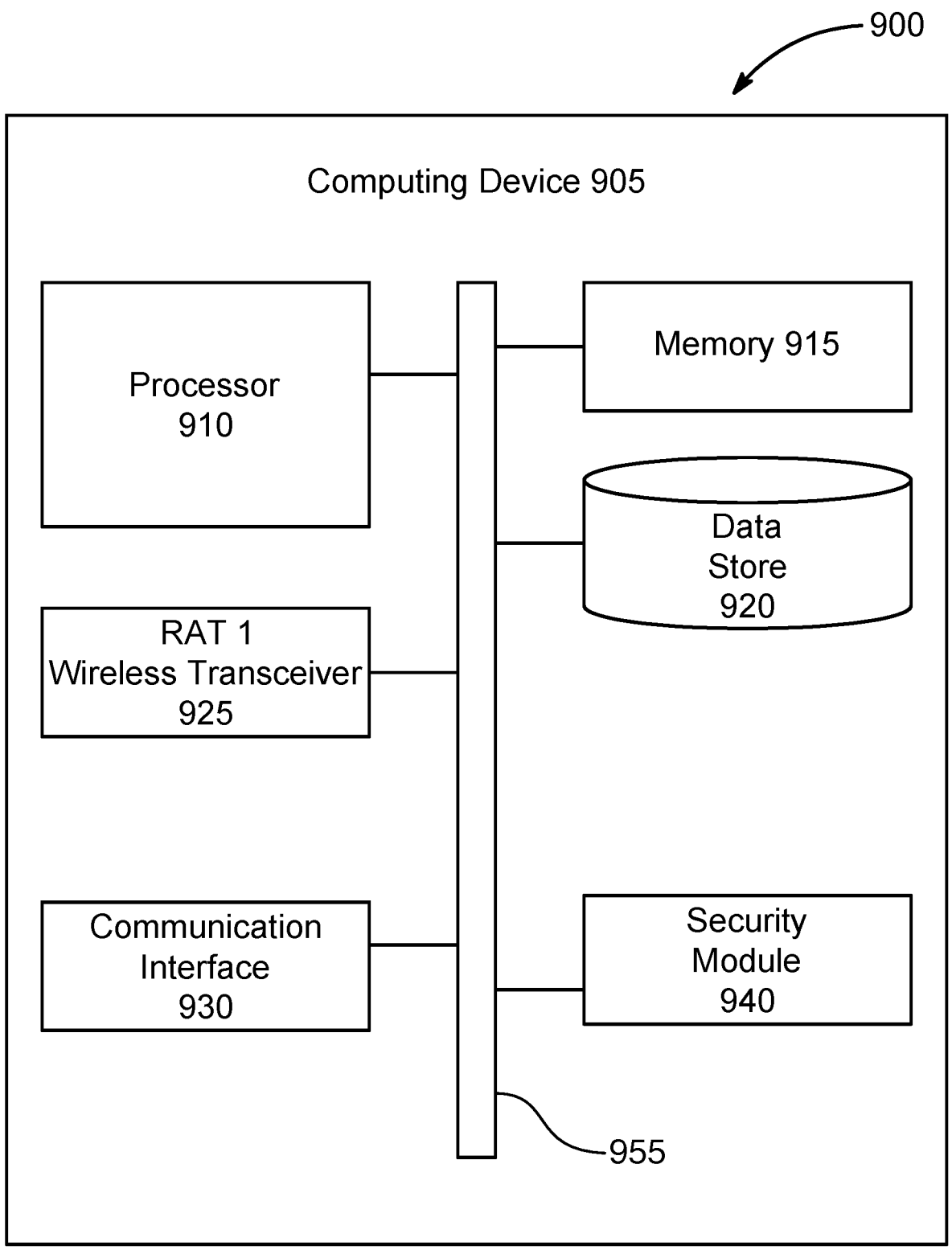
FIG. 9 is a block diagram of a computing device for implementing the described systems, methods, and devices.

FIG. 9 is a block diagram 900 of a computing device 905 for implementing the described systems, methods, and devices. In some embodiments, the node 205 may be an example of the computing device 905.

The computing device 905 includes a processor 910 (including a general-purpose processor and one or more application specific processors, for example), an optional wireless transceiver 925 for communicating via a first radio access technology (RAT) (e.g., 3G, 4G, LTE, 5G-NR, and/or LoRaWAN), an optional communication interface 930 for communicating via a network (e.g., wired (e.g., Medic LAN, Ethernet), wireless (e.g., Bluetooth, Wi-Fi)), a memory 915 (e.g., random access memory (RAM), non-volatile RAM (NVRAM)), data store 920 (e.g., hard disk drive, solid state disk), a security module 940 that implements the token secured routing functions, and an interconnect or bus 955 for interconnecting each of the components 910-940.

In some embodiments, the memory 915 and/or the data store 920 (each being a non-transitory storage medium, for example) may store instructions that are executable by the processor 910 (e.g., processor and memory 915) to implement the systems, methods, and devices described herein. For example, the instructions may be executable by the processor 910 to implement any of the methods (e.g., method 800).

The invention has been described with reference to various specific and preferred embodiments and techniques. Nevertheless, it is understood that many variations and modifications may be made while remaining within the spirit and scope of the invention.

What is claimed is:

1. A method for internet of things (IOT) discovery:
receiving a discovery packet from a device, wherein the discovery packet comprises a first stream identifier and a request to establish a second stream;
identifying a registration associated with the device in a routing table, wherein the registration is identified based on the first stream identifier;
determining a destination for the second stream based on the request to establish the second stream;
sending a stream acceptance packet to the device, wherein the stream acceptance packet comprises the first stream identifier and an input for generating a second stream identifier;
adding a first association to the registration based on the request to establish the second stream, wherein the first association is between the second stream identifier and the destination;
receiving a first data packet from the device, wherein the first data packet comprises the second stream identifier; and
sending the first data packet to the destination based on the first association in the registration.

2. The method of claim 1, further comprising:
determining whether the registration exists in the routing table.

3. The method of claim 2, further comprising:
disregarding the discovery packet when the registration is absent from the routing table.

4. The method of claim 2, further comprising:
processing the discovery request when the registration exists in the routing table; and
accepting the request to establish the second stream when the registration exists in the routing table.

5. The method of claim 1, wherein the input initiates a key establishment procedure with the device.

6. The method of claim 5, wherein the key establishment procedure is a Diffie-Hellman key exchange.

7. The method of claim 5, wherein at least a portion of the second stream identifier is a secure key established via the key establishment procedure.

8. The method of claim 7, wherein the first data packet is cryptographically secured based on the second stream identifier.

9. The method of claim 1, wherein the first stream identifier is associated with a device identifier.

10. The method of claim 9, wherein the device identifier is a globally unique identifier (GUID).

11. A device for internet of things (IOT) discovery, comprising:
  a processor;
  memory in electronic communication with the processor, wherein the instructions are executable by the processor to:
    receive a discovery packet from a device, wherein the discovery packet comprises a first stream identifier and a request to establish a second stream;
    identify a registration associated with the device in a routing table, wherein the registration is identified based on the first stream identifier;
    determine a destination for the second stream based on the request to establish the second stream;
    send a stream acceptance packet to the device, wherein the stream acceptance packet comprises the first stream identifier and an input for generating a second stream identifier;
    add a first association to the registration based on the request to establish the second stream, wherein the first association is between the second stream identifier and the destination;
    receive a first data packet from the device, wherein the first data packet comprises the second stream identifier; and
    send the first data packet to the destination based on the first association in the registration.

12. The device of claim 11, wherein the instructions are further executable by the processor to determine whether the registration exists in the routing table.

13. The device of claim 12, wherein the instructions are further executable by the processor to disregard the discovery packet when the registration is absent from the routing table.

14. The device of claim 12, wherein the instructions are further executable by the processor to:
  process the discovery request when the registration exists in the routing table; and
  accept the request to establish the second stream when the registration exists in the routing table.

15. The device of claim 11, wherein the input initiates a key establishment procedure with the destination.

16. The device of claim 15, wherein the key establishment procedure is a Diffie-Hellman key exchange.

17. The device of claim 15, wherein at least a portion of the second stream identifier is a secure key established via the key establishment procedure.

18. The device of claim 17, wherein the first data packet is cryptographically secured based on the second stream identifier.

19. The device of claim 11, wherein the first stream identifier is associated with a device identifier.

20. The device of claim 19, wherein the device identifier is a globally unique identifier (GUID).

* * * * *